(12) United States Patent
Thiele

(10) Patent No.: US 8,043,715 B2
(45) Date of Patent: Oct. 25, 2011

(54) PAPER AND PAPER LAMINATES CONTAINING MODIFIED TITANIUM DIOXIDE

(75) Inventor: Erik Shepard Thiele, Genolier (CH)

(73) Assignee: E. I. du Pont de Nemours and Company, Wilmington, DE (US)

(*) Notice: Subject to any disclaimer, the term of this patent is extended or adjusted under 35 U.S.C. 154(b) by 606 days.

(21) Appl. No.: 11/447,660

(22) Filed: Jun. 6, 2006

(65) Prior Publication Data

US 2006/0275597 A1    Dec. 7, 2006

Related U.S. Application Data

(60) Provisional application No. 60/688,098, filed on Jun. 7, 2005.

(51) Int. Cl.
*B32B 5/16* (2006.01)
(52) U.S. Cl. ............ 428/537.5; 428/323; 428/328; 428/403; 428/404; 428/407
(58) Field of Classification Search ............... 428/537.5, 428/407, 323, 328, 403, 404
See application file for complete search history.

(56) References Cited

U.S. PATENT DOCUMENTS

| | | | |
|---|---|---|---|
| 3,290,165 A | 12/1966 | Iannicelli et al. | |
| 3,834,924 A | 9/1974 | Grillo | |
| 4,083,946 A | 4/1978 | Schurr et al. | |
| 4,141,751 A | 2/1979 | Moreland | |
| RE30,233 E | 3/1980 | Lane et al. | |
| RE30,450 E | 12/1980 | Iannicelli | |
| 4,239,548 A | 12/1980 | Barnard et al. | |
| 4,303,702 A | 12/1981 | Bullock, Jr. et al. | |
| 4,461,810 A | 7/1984 | Jacobson | |
| 4,599,124 A | 7/1986 | Kelly et al. | |
| 4,689,102 A | 8/1987 | Prawdzik et al. | |
| 4,737,194 A | 4/1988 | Jacobson | |
| 4,820,750 A | 4/1989 | Lehr et al. | |
| 5,425,986 A | 6/1995 | Guyette et al. | |
| 5,679,219 A | 10/1997 | Harms et al. | |
| 6,225,014 B1 * | 5/2001 | Patterson et al. | 430/64 |
| 6,287,681 B1 | 9/2001 | Mehta et al. | |
| 6,290,815 B1 | 9/2001 | Magnin et al. | |
| 6,352,610 B1 | 3/2002 | Schmidt et al. | |
| 6,413,618 B1 | 7/2002 | Parker et al. | |
| 6,551,455 B2 | 4/2003 | Johnson et al. | |
| 6,706,372 B2 | 3/2004 | Schulz et al. | |
| 6,709,764 B1 | 3/2004 | Perrin et al. | |
| 6,761,979 B2 | 7/2004 | Yokochi et al. | |
| 6,783,631 B2 | 8/2004 | Schulz | |
| 6,890,610 B2 * | 5/2005 | Bringley et al. | 428/32.36 |
| 7,169,223 B1 * | 1/2007 | Pfaff et al. | 106/482 |
| 2003/0138600 A1 | 7/2003 | Dohring et al. | |

FOREIGN PATENT DOCUMENTS

| | | |
|---|---|---|
| JP | 07267640 | 10/1995 |
| JP | 09269557 | 10/1997 |
| WO | WO 97/07879 A1 | 3/1997 |
| WO | WO 02/10293 A2 | 2/2002 |
| WO | WO 02/102167 A1 | 12/2002 |
| WO | WO 2004/061013 A2 | 7/2004 |

OTHER PUBLICATIONS

International Search Report, Mar. 14, 2008, PCT.
V. M. Gun'Ko et al., Royal Society of Chemistry, 1999, vol. 235:183-190, Fundamental and Applied Aspects of Chemically Modified Surfaces.
V. M. Gun'Ko et al., Journal of Adhesion Science and Technology, 1997, vol. 11:627-653.
Esumi et al., Bullentin of the Chemical Society of Japan, 1983, vol. 56:331-332.

* cited by examiner

*Primary Examiner* — Leszek Kiliman

(57) ABSTRACT

The present invention pertains to a laminate paper and a paper laminate made from such paper. More specifically, the laminate paper contains an amino organosilane surface-modified titanium dioxide pigment.

19 Claims, No Drawings

PAPER AND PAPER LAMINATES CONTAINING MODIFIED TITANIUM DIOXIDE

CROSS-REFERENCE TO RELATED APPLICATIONS

This application claims the benefit of U.S. Provisional Application No. 60/688,098 filed Jun. 7, 2005 incorporated by reference herein in its entirety.

BACKGROUND OF THE INVENTION

The present invention pertains to a paper and paper laminate made from such paper. More specifically, the paper contains an amino organosilane surface-modified titanium dioxide pigment.

Paper laminates are in general well-known in the art, being suitable for a variety of uses including table and desk tops, countertops, wall panels, floor surfacing, tableware and the like. Paper laminates have such a wide variety of uses because they can be made to be extremely durable, and can be also made to resemble (both in appearance and texture) a wide variety of construction materials, including wood, stone, marble and tile, and can be decorated to carry images and colors.

Typically, the paper laminates are made from papers by impregnating the papers with resins of various kinds, assembling several layers of one or more types of laminate papers, and consolidating the assembly into a unitary core structure while converting the resin to a cured state. The type of resin and laminate paper used, and composition of the final assembly, are generally dictated by the end use of the laminate.

Decorative paper laminates can be made by utilizing a decorated paper layer as upper paper layer in the unitary core structure. The remainder of the core structure typically comprises various support paper layers, and may include one or more highly-opaque intermediate layers between the decorative and support layers so that the appearance of the support layers does not adversely impact the appearance of decorative layer.

Paper laminates may be produced by both low- and high-pressure lamination processes.

Various methods can be employed to provide paper laminates by low-pressure lamination. For example, a single opening, quick cycle press can be used where one or more resin-saturated paper sheets are laminated to a sheet of plywood, particle board, or fiberboard. A "continuous laminator" can be used where one or more layers of the resin-saturated paper are pressed into a unitary structure as the layers move through continuous laminating equipment between plates, rollers or belts. Alternatively, a laminated sheet (continuous web or cut to size) may be pressed onto a particle or fiberboard, etc. and a "glue line" used to bond the laminated sheet to the board. Single or multiple opening presses may also be employed which contain several laminates.

In making paper laminates via high-pressure lamination, a plurality of sheets are impregnated with a thermosetting resin and stacked in superimposed relation, optionally with a decorative sheet placed on top. This assembly is then heat and pressure consolidated at pressures of at least about 500 psi. Generally, more than one laminate is formed at one time by inserting a plurality of sheet assemblies in a stack with each assembly being separated by a release medium which allows the individual laminates to be separated after heat and pressure consolidation.

The laminates so formed are then bonded to a substrate, such as plywood, hardboard, particle board, fiberboard, composites and the like, by the use of adhesives such as contact adhesives, urea-formaldehyde, white glues (polyvinyl acetate emulsions), hot melts, phenolic or resorcinol formaldehyde, epoxy, coal tar, animal glues and the like.

It has been found desirable during the production of such laminates, by either low- or high-pressure lamination processes, to impart abrasion-resistant characteristics to the decorative surface portion of the laminate to enhance the utility of such laminates in end-use applications such as table and countertops, wall panels and floor surfacing. Such abrasion resistance can, for example, be imparted to paper laminates by means of an applied overlay sheet that provides a barrier over the print sheet. If the print sheet is decorative, the overlay should be substantially transparent. Abrasion-resistant resin coatings have also been applied to the surface of the laminate.

It has also been found desirable to impart moisture barrier properties to the base of such paper laminates, which can be done by bonding a moisture-barrier layer to the base of the laminate.

Examples of such paper laminates may be found, for example, in U.S. RE Pat. No. 30,233, U.S. Pat. Nos. 4,239,548, 4,599,124, 4,689,102, 5,425,986, 5,679,219, 6,287,681, 6,290,815, 6,413,618, 6,551,455, 6,706,372, 6,709,764, 6,761,979, 6,783,631 and U.S. 2003/0138600, the disclosures of which are incorporated by reference herein for all purposes as if fully set forth.

The papers in such paper laminates generally comprises a resin-impregnated, cellulose pulp-based sheet, with the pulp being based predominantly on hardwoods such as eucalyptus, sometimes in combination with minor amounts of softwood pulps. Pigments (such as titanium dioxide) and fillers are added in amounts generally up to and including about 45 wt % (based on the total dry weight prior to resin impregnation) to obtain the required opacity. Other additives such as wet-strength, retention, sizing (internal and surface) and fixing agents may also be added as required to achieve the desired end properties of the paper. Resins used to impregnate the papers include, for example, diallyl phthalates, epoxide resins, urea formaldehyde resins, urea-acrylic acid ester copolyesters, melamine formaldehyde resins, melamine phenol formaldehyde resins, phenol formaldehyde resins, poly (meth)acrylates and/or unsaturated polyester resins.

Examples of papers used in paper laminates may be found in U.S. Pat. No. 6,599,592 (the disclosure of which is incorporated by reference herein for all purposes as if fully set forth) and the above-incorporated references, including but not limited to U.S. Pat. Nos. 5,679,219, 6,706,372 and 6,783,631.

As indicated above, the paper typically comprises a number of components including, for example, various pigments, retention agents and wet-strength agents. The pigments, for example, impart desired properties such as opacity and whiteness to the final paper, and a commonly used pigment is titanium dioxide that is, in a relative sense, expensive in nature. Retention aids are added in order to minimize losses of titanium dioxide and other fine components during the papermaking process, which adds cost, as do the use of other additives such as wet-strength agents.

It has now been found that the use of an amino organosilane surface-modified titanium dioxide pigment in the laminate paper, either as the titanium dioxide pigment or to replace a portion thereof, can provide improved opacity to the final paper and/or enhance the retention rate of the particulates, and especially the titanium dioxide pigment component, during the papermaking process. These benefits can, for example, reduce pigment losses during the papermaking process, as well as possibly allowing the reduced use of retention and wet-strength agents in the papermaking process and in the finished paper.

SUMMARY OF THE INVENTION

In accordance with one aspect of the present invention, there is provided a laminate paper comprising a resin-impregnated, opaque, cellulose pulp-based sheet containing a titanium dioxide pigment component in an amount of about 45 wt % or less (based on the total dry weight of the sheet prior to resin impregnation), wherein the titanium dioxide pigment component comprises an amino organosilane surface-modified titanium dioxide pigment.

In accordance with another aspect of the present invention, there is provided a paper laminate comprising a substantially unitary consolidated structure containing a plurality of layers, wherein at least one of the layers is derived from a resin-impregnated, opaque, cellulose pulp-based laminate paper sheet containing a titanium dioxide pigment component in an amount of about 45 wt % or less (based on the total dry weight of the sheet prior to resin impregnation), wherein the titanium dioxide pigment component comprises an amino organosilane surface-modified titanium dioxide pigment.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

Titanium Dioxide Pigment

Titanium dioxide ($TiO_2$) pigment useful in the present invention may be in the rutile or anatase crystalline form, with the rutile form being preferred. It is commonly made by either a chloride process or a sulfate process. In the chloride process, $TiCl_4$ is oxidized to $TiO_2$ particles. In the sulfate process, sulfuric acid and ore containing titanium are dissolved, and the resulting solution goes through a series of steps to yield $TiO_2$. Both the sulfate and chloride processes are described in greater detail in "The Pigment Handbook", Vol. 1, 2nd Ed., John Wiley & Sons, NY (1988), the relevant teachings of which are incorporated herein by reference for all purposes as if fully set forth.

By "pigment" it is meant that the titanium dioxide particles have an average size of less than about 1 micron. Preferably, the particles have an average size of from about 0.020 to about 0.95 microns, more preferably from about 0.050 to about 0.75 microns, and most preferably from about 0.075 to about 0.50 microns. Also preferred are pigments with a specific gravity in the range of about 3.5 to about 6 g/cc.

The titanium dioxide pigment may be substantially pure titanium dioxide, or may contain other metal oxides such as silica, alumina and/or zirconia. Other metal oxides may become incorporated into the pigment particles for example, by co-oxidizing or co-precipitating titanium compounds with other metal compounds. If co-oxidized or co-precipitated metals are present, they are preferably present (as the metal oxide) in an amount form about 0.1 wt % to about 20 wt %, preferably from about 0.5 wt % to about 5 wt %, and more preferably from about 0.5 wt % to about 1.5 wt %, based on the total pigment weight.

The titanium dioxide pigment may also bear one or more metal oxide and/or phosphated surface coatings, such as disclosed in U.S. Pat. Nos. 4,461,810, 4,737,194 and WO2004/061013 (the disclosures of which are incorporated by reference herein for all purposes as if fully set forth). These coatings may be applied using techniques known by those skilled in the art. Examples of metal oxide coatings include silica, alumina, ceria and/or zirconia among others. Such coatings may, for example, be present in an amount of from about 0.1 wt % to about 20 wt %, and preferably from about 0.5 wt % to about 10 wt %, based on the total weight of the pigment.

Preferred are the phosphated metal oxide coated titanium dioxide pigments, such as the phosphated alumina and phosphated alumina/ceria oxide coated varieties.

Examples of suitable commercially available titanium dioxide pigments include alumina-coated titanium dioxide pigments such as R700 and R706 (available from E. I. duPont de Nemours and Company, Wilmington Del.) and RDI-S (available from Kemira Industrial Chemicals, Helsinki, Finland), alumina/phosphate coated titanium-dioxide pigments such as R796 (available from E. I. duPont de Nemours and Company, Wilmington Del.); and alumina/phosphate/ceria coated titanium-dioxide pigments such as R794 (available from E. I. duPont de Nemours and Company, Wilmington Del.).

The titanium dioxide pigment may be surface treated. By "surface treated" it is meant titanium dioxide pigment particles that have been contacted with the compounds described herein wherein the compounds are adsorbed on the surface of the titanium dioxide particle, or a reaction product of at least one of the compounds with the titanium dioxide particle is present on the surface as an adsorbed species or chemically bonded to the surface. The compounds or their reaction products or combination thereof may be present as a coating, either single layer or double layer, continuous or non-continuous, on the surface of the pigment.

For example, the titanium dioxide pigment may bear one or more organic surface coatings, such as, for example, carboxylic acids, silanes, siloxanes and hydrocarbon waxes, and their reaction products with the titanium dioxide surface. The amount of organic surface coating, when present, generally ranges from about 0.01 wt % to about 6 wt %, preferably from about 0.1 wt % to about 3 wt %, more preferably about 0.5 wt % to about 1.5 wt %, and still more preferably about 1 wt %, based on the total weight of the pigment.

In accordance with the present invention, at least a portion of the titanium oxide pigment is surface-modified (surface treated) with an amino organosilane. Suitable amino organosilanes are disclosed, for example, in U.S. Pat. Nos. 3,290,165, 3,834,924, 4,141,751 and 4,820,750, the disclosures of which are incorporated by reference for all purposes as if fully set forth.

Preferred amino organosilanes are those of the general formula (I)

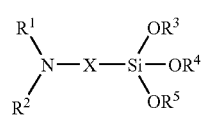

wherein:

$R^1$ and $R^2$ are each individually selected from the group consisting of hydrogen, alkyl, aryl, cycloalkyl, alkylaryl, alkenyl, cycloalkenyl, alkene, alkylene, arylene, alkylarylene, arylalkylene and cycloalkylene;

$R^3$, $R^4$ and $R^5$ are each individually selected from the group consisting of hydrogen, lower alkyl, aryl, lower alkylaryl, lower arylalkyl, alkenyl, cycloalkenyl, alkene, alkylene, arylene, alkylarylene, arylalkylene and cycloalkylene; and X is alkyl, aryl, alkylaryl, arylalkyl, cycloalkyl, alkenyl, cycloalkenyl, alkene, alkenylene, cycloalkenylene, alkylene, arylene, alkylarylene, arylalkylene, cycloalkylene, with or without secondary and/or tertiary nitrogen pendant from the chain or other functional groups.

Particularly preferred are amino organosilanes of the formula (I) wherein:

$R^1$ and $R^2$ are each individually selected from the group consisting of hydrogen and an alkyl group of 1-8 carbon atoms, more preferably wherein at least one of $R^1$ and $R^2$ is hydrogen, and especially when both of $R^1$ and $R^2$ are hydrogen; and/or $R^3$, $R^4$ and $R^5$ are each individually selected from the group consisting of hydrogen and an alkyl group of 1-8 carbon atoms, more preferably $R^3$, $R^4$ and $R^5$ are each individually selected from an alkyl group of 1-8 carbon atoms, still more preferably an alkyl group of 14 carbon atoms, and especially an alkyl group of 1-2 carbon atoms; and/or X is an alkyl group of 1-8 carbon atoms, and more preferably 1-4 carbon atoms.

Examples of preferred amino organolsilanes include aminoethyl trimethoxysilane, aminoethyl triethoxysilane, aminopropyl trimethoxysilane, aminopropyl triethoxysilane, methylaminopropyl trimethoxysilane, ethylaminopropyl trimethoxysilane, aminopropyl tripropoxysilane, aminoisobutyl trimethoxysilane, and aminobutyl triethoxysilane. An especially preferred amino organosilane is aminopropyl triethoxysilane.

The titanium dioxide can be surface treated with the amino organosilane in any number of ways well-known to those of ordinary skill in the relevant art, as exemplified by the previously incorporated references mentioned above. For example, the organosilane can be applied by injector treatment, addition to a micronizer, or by simple blending with a slurry of the titanium dioxide.

Preferably, the organosilane is applied in amounts and via methods, preferably by injector treatment, so as to result in a substantially monolayer coverage of the organosilane on the surface of the titanium dioxide.

One especially useful method for applying the organosilane to the titanium dioxide is by metering a liquid composition comprising the organosilane into a flow restrictor and injecting a gas stream through the flow restrictor concurrently with the metering of the liquid to create a zone of turbulence at the outlet of the flow restrictor thereby atomizing the liquid composition and adding the titanium dioxide to the zone of turbulence concurrently with the metering of the liquid and the injection of the gas to mix the titanium dioxide with the atomized liquid composition. Such processes are well known and disclosed in WO 97/07879; WO 02/102167; WO 02/10293; U.S. Pat. Nos. 4,303,702 and 4,083,946 which are each incorporated by reference in their entireties.

"Substantially monolayer coverage", for the purposes of this disclosure, means that the surface of the titanium dioxide pigment is substantially saturated with a layer of organosilane, with the organosilane molecules being bonded to a site on the pigment surface. As the number of sites on the pigment surface is not infinite, there is an upper limit as to how much organosilane can bond to the pigment surface. Below the saturation level, it is relatively easy to incorporate more organosilane on the surface using injector treatment. As the saturation level is reached and exceeded, the amount of organosilane retained on the surface diminishes and, as more organosilane is added, a greater portion comes off as excess. Above the monolayer coverage, excess organosilane can be extracted from the surface using solvent extraction since the excess is not bound to the pigment surface.

The amount of organosilane in a substantially monolayer coverage will vary depending on the type of titanium dioxide pigment utilized. Depending on the specific titanium dioxide pigment used, a person of ordinary skill in the relevant art can readily make this determination based on conventional techniques.

In addition, the amount of organosilane required to achieve a substantially monolayer coverage will vary depending on the type of titanium dioxide pigment utilized and the application method. Again, depending on the specific titanium dioxide pigment and application method used, a person of ordinary skill in the relevant art can readily make this determination based on conventional techniques.

The surface-modified titanium dioxide can be dispersed in water at a concentration of below about 10 weight percent, based on the entire weight of the dispersion, typically about 3 to about 5 weight percent using any suitable technique known in the art. An example of a suitable dispersion technique is sonication. The surface-modified titanium dioxide of this disclosure is cationic. The isoelectric point, determined by the pH value when the zeta potential has a value of zero, of the surface-modified titanium dioxide of this disclosure has an isoelectric point greater than 8, typically greater than 9, even more typically in the range of about 9 to about 10. The isoelectric point can be determined using the zeta potential measurement procedure described in the Examples set forth hereinbelow.

To form a paper sheet, the titanium dioxide suspension can be mixed with pulp, for example refined wood pulp such as eucalyptus pulp, in an aqueous dispersion. The pH of the pulp dispersion is typically about 6 to about 8, more typically about 7 to about 7.5. The pulp dispersion can be used to form paper by conventional techniques.

The ash content of paper made from the surface-modified titanium dioxide of this disclosure was found to be significantly higher than the ash content of paper made from conventional titanium dioxide. As such, the surface-modified titanium dioxide of this disclosure is considered to promote a stronger interaction of the pigment with the pulp which translates to a higher titanium dioxide first-pass retention. In this context, first pass retention of titanium dioxide refers to that fraction of titanium dioxide present in the papermaking stock, just prior to drainage to form the paper sheet, that is retained in the sheet. In the laboratory production of paper handsheets, use of the surface-modified titanium dioxide can increase first-pass retention from about 20% for untreated titanium oxide in contact with untreated, refined eucalyptus pulp in handsheets to about 45% and typically from about 40% to about 60%. The ash content can be determined using the standard ash measurement technique determined by burning the paper in an oxygen-enriched laboratory vessel as described in the Examples set forth hereinbelow. Paper made from the surface-modified titanium dioxide can have greater tensile strength than paper made using conventional titanium dioxide as determined by the wet and dry machine and cross-machine direction test methods described in part 2 of ISO 1924. The improvement in tensile strength can range from about 20 to about 30% higher as compared to the tensile strength of paper made using conventional titanium dioxide.

Laminate Paper

The amino organosilane surface-modified titanium dioxide pigment can be used to prepare laminate paper in any of the customary ways, wherein at least a portion of the titanium dioxide pigment typically used in such papermaking is replaced with the amino organosilane surface-modified titanium dioxide pigment.

As indicated above, the laminate paper in accordance with the present invention is an opaque, cellulose pulp-based sheet containing a titanium dioxide pigment component in an amount of about 45 wt % or less, more preferably from about 10 wt % to about 45 wt %, and still more preferably from about 25 wt % to about 42 wt %, wherein the titanium dioxide pigment component comprises an amino organosilane surface-modified titanium dioxide pigment. In one preferred embodiment, the titanium dioxide pigment component comprises at least about 25 wt %, and more preferably at least about 50 wt % (based on the weight of the titanium dioxide pigment component) of an amino organosilane surface-modified titanium dioxide pigment. In another preferred embodiment, the titanium dioxide pigment component consists essentially of an amino organosilane surface-modified titanium dioxide pigment. In yet another preferred embodiment, the titanium dioxide pigment component comprises substantially only an amino organosilane surface-modified titanium dioxide pigment.

For paper laminate applications, the laminate paper should preferably be of uniform weight so that the finished product will have a substantially even thickness. The laminate paper must also be properly porous and absorbent so it will carry just the right amount of impregnating resin.

For a decorative laminate paper, the paper should be substantially white so as to not impart any undesired coloration to the final decorative pattern.

The decorative laminate paper can also be printed by various well-known analog and digital printing methods to impart desired coloration and designs as required for the particular end use. Analog printing methods such as screen printing are particularly suitable for large runs and consistent patterns. Digital printing methods such as inkjet printing are particularly suitable for short runs and customized patterning.

These and other considerations and parameters involved in the composition, production and decoration of laminate paper are well known to those of ordinary skill in the art as evidenced by many of the previously incorporated references.

Paper Laminates

Paper laminates in accordance with the present invention can be made by any of the conventional processes well known to those of ordinary skill in the relevant art, as described in many of the previously incorporated references.

Typically, the process of making paper laminates begins with raw materials—impregnating resins such as phenolic and melamine resins, brown paper (such as craft paper) and high-grade print paper (a laminate paper in accordance with the present invention).

The brown paper serves as a carrier for the impregnating resins, and lends reinforcing strength and thickness to the finished laminate. The high-grade paper is the decorative sheet, for example, a solid color, a printed pattern or a printed wood grain.

In an industrial-scale process, rolls of paper are typically loaded on a spindle at the "wet end" of a resin treater for impregnation with a resin. The high-grade (decorative) surface papers are treated with a clear resin, such melamine resin, so as to not affect the surface (decorative) appearance of the paper. Since appearance is not critical for the brown paper, it may be treated with a colored resin such as phenolic resin.

Two methods are commonly used to impregnate the paper with resin. The usual way (and the fastest and most efficient) is called "reverse-roll coating." In this process, the paper is drawn between two big rollers, one of which applies a thin coating of resin to one side of the paper. This thin coating is given time to soak through the paper as it passes through to a drying oven. Almost all of the brown paper is treated by the reverse-roll process, because it is more efficient and permits full coating with less resin and waste.

Another way is a "dip and squeeze" process, in which the paper is drawn through a vat of resin, then passed through rollers that squeeze off excess resin. The surface (decorative) papers are usually resin impregnated by the dip-and-squeeze process because, although slower, it permits a heavier coating of the impregnating resin for improves surface properties in the final laminate, such as durability and resistance to stains and heat.

After being impregnated with resin, the paper (as a continuous sheet) is passed through a drying (treater) ovens to the "dry end," where it is cut into sheets.

The resin-impregnated paper should be consistent to avoid unevenness in the finished laminate.

In the assembly of the laminate components, the top is generally the surface paper since what the finished laminate looks like depends mainly on the surface paper. A topmost "overlay" sheet that is substantially transparent when cured may, however, be placed over the decorative sheet, for example, to give depth and wear resistance to the finished laminate.

In a laminate where the surface paper has light-hued solid colors, an extra sheet of fine, white paper may be placed beneath the printed surface sheet to prevent the amber-colored phenolic filler sheet from interfering with the lighter surface color.

The texture of the laminate surface is determined by textured paper and/or a plate that is inserted with the buildup into the press. Typically, steel plates are used, with a highly polished plate producing a glossy finish, and an etched textured plate producing a matte finish.

The finished buildups are sent to a press, with each buildup (a pair of laminates) is separated from the next by the above-mentioned steel plate. In the press, pressure is applied to the buildups by hydraulic rams or the like. Typically, at least 800 psi, and sometimes as much as 1,500 psi pressure is applied, while the temperature is raised to more than 250° F. by passing superheated water or steam through jacketing built into the press. The buildup is maintained under these temperature and pressure conditions for a time (typically about one hour) required for the resins in the resin-impregnated papers to re-liquefy, flow and cure, bonding the stack together into a single sheet of finished, decorative laminate.

Once removed from the press, the laminate sheets are separated and trimmed to the desired finished size. Typically the reverse side of the laminate is also roughened (such as by sanding) to provide a good adhesive surface for bonding to one or more substrates such as plywood, hardboard, particle board, composites and the like. The need for and choice of substrate and adhesive will depend on the desired end use of the laminate, as will be recognized by one of ordinary skill in the relevant art.

The following Examples illustrate the present disclosure. All parts, percentages and proportions are by weight unless otherwise indicated.

COMPARATIVE EXAMPLE 1

A dry titanium dioxide product is manufactured using the chloride process and milled using a fluid energy mill. The titanium dioxide surface is treated with inorganic compounds so that the nominal composition of the pigment measured using the x-ray fluorescence method is about 91.9 $TiO_2$, 5.2% $Al_2O_3$, and 2.9% $P_2O_5$. This dry titanium dioxide product is dispersed in deionized water at a concentration of about 4.0 weight percent using sonication. No surface treatment with the silane agent is performed. The zeta potential of this suspension is measured over a range of pH values from about 4.0 to about 9.0 by titrating the suspension with potassium hydroxide solution to increase the suspension pH and with nitric acid solution to decrease the suspension pH. The zeta potential measurement is performed using a Collodal Dynamics Acoustosizer II instrument. The resulting zeta potential values are shown as a function of pH in Table 1.

TABLE 1

Zeta potential of pigment Comparative Example 1

| pH | zeta potential (mV) |
|---|---|
| 4.2 | 35 |
| 4.7 | 29 |
| 5.5 | 15 |
| 6.0 | 4 |
| 6.1 | 0 |
| 6.6 | −9 |
| 7.0 | −19 |
| 7.3 | −28 |
| 7.7 | −34 |
| 8.0 | −39 |
| 8.4 | −42 |
| 9.0 | −46 |

EXAMPLE 1

The same dry titanium dioxide product described in Comparative Example 1, manufactured using the chloride process and milled using a fluid energy mill, is subsequently treated with a nearly pure solution of 3-aminopropyltriethoxysilane to yield about 1.0% coating level of silane on the surface. The deposition of the silane onto the titanium dioxide particle surfaces is accomplished using injector treatment technology, whereby the silane solution is sprayed onto a moving stream of fluidized titanium dioxide powder which is pneumatically conveyed through a metal pipe under turbulent conditions. The flow rates of the titanium dioxide powder through the pipe and the silane solution through the spray nozzle are controlled so as to yield the desired concentration of silane on the titanium dioxide surface. The resulting titanium dioxide product is dispersed in deionized water at a concentration of about 4.0 weight percent using sonication. The zeta potential of this suspension is measured over a range of pH values from about 4.0 to about 9.0 by titrating the suspension with potassium hydroxide solution to increase the suspension pH and with nitric acid solution to decrease the suspension pH. The zeta potential measurement is performed using a Collodal Dynamics Acoustosizer II instrument. The resulting zeta potential values are shown as a function of pH in Table 2.

TABLE 2

Zeta potential of pigment from Example 1

| pH | zeta potential (mV) |
|---|---|
| 4.0 | 53 |
| 4.2 | 51 |
| 4.8 | 47 |
| 5.2 | 43 |
| 5.7 | 38 |
| 6.3 | 33 |
| 6.6 | 29 |
| 7.3 | 22 |
| 7.7 | 16 |
| 8.2 | 10 |
| 8.7 | 6 |
| 9.2 | 3 |

For all pH values, the zeta potential value is positive (or cationic).

In Table 1, the zeta potential values are positive (cationic) for pH values lower than 6.1 and negative (anionic) for pH values greater than 6.1. This pH value where the zeta potential is about zero is defined as the isoelectric point. Comparison of the zeta potential data in Table 1 and Table 2 indicate that the treatment of the titanium dioxide surface with the silane compound (Example 1) has rendered the pigment surface far more cationic. In the case of the pigment described in Example 1, the isoelectric point is above a pH value of 9.2, compared to an isoelectric point of 6.1. The results from Comparative Example 1 and Example 1 indicate that the isoelectric point of the titanium dioxide pigment described in Comparative Example 1 can be altered over the pH range from about 6.1 to more than 9.0 by adjusting the amount of the silane compound deposited on the pigment surface.

COMPARATIVE EXAMPLE 2

A dry titanium dioxide product is manufactured using the chloride process and milled using a fluid energy mill. The titanium dioxide surface is treated with inorganic compounds so that the nominal composition of the pigment measured using the x-ray fluorescence method is about 93.5 $TiO_2$, 5.0% $Al_2O_3$, and 1.5% $P_2O_5$. About 2 grams of this pigment is dispersed into deionized water at a concentration of about 1.0 weight percent using a standard laboratory blender. This suspension is added to a mixture of about 1.8 grams of refined eucalyptus pulp dispersed in about 350 grams of water, and the pH of this mixture is adjusted to about 7.5. The resulting mixture is stirred using magnetic stirring for about one minute and then poured into a standard laboratory handsheet former. The suspension is drained through the handsheet former to yield a wet handsheet consisting of pulp and titanium dioxide. This handsheet is then pressed and dried using standard methods. The basis weight of the dried handsheet is deteremined by measuring the weight of a known area (measured in square meters) of the handsheet. The concentration of titanium dioxide present in the handsheet is subsequently determined using a standard ash measurement. In this measurement, a known weight of the handsheet is ignited and burned in an oxygen-enriched laboratory vessel. This causes removal of essentially all of the pulp. The remaining ash product is assumed to consist entirely of titanium dioxide. The results of the basis weight and ash measurements for the pigment described in this Comparative Example is shown in Table 3.

TABLE 3

Basis weight and ash values for a handsheet made using the pigment from Comparative Example 2

| Basis weight (grams per square meter) | Ash (% titanium dioxide) |
|---|---|
| 97.4 | 19.3 |

EXAMPLE 2

About 2 grams of the titanium dioxide pigment described in Comparative Example 2 is subsequently coated using injector treatment technology with a nearly pure solution of 3-aminopropyltriethoxysilane to yield about 1.0% coating level of silane on the surface. This treated pigment is dispersed into deionized water at a concentration of about 1.0 weight percent using a standard laboratory blender. This suspension is added to a mixture of about 1.8 grams of refined eucalyptus pulp dispersed in about 350 grams of water, and the pH of this mixture is adjusted to about 7.5. The resulting mixture is stirred using magnetic stirring for about one minute and then poured into a standard laboratory handsheet former. The suspension is drained through the handsheet former to yield a wet handsheet consisting of pulp and titanium dioxide. This handsheet is then pressed and dried using standard methods. The basis weight of the dried handsheet is determined by measuring the weight of a known area (measured in square meters) of the handsheet. The concentration of titanium dioxide present in the handsheet is subsequently determined using a standard ash measurement. In this measurement, a known weight of the handsheet is ignited and burned in an oxygen-enriched laboratory vessel. This causes removal of essentially all of the pulp. The remaining ash product is assumed to consist entirely of titanium dioxide. The results of the basis weight and ash measurements for the pigment described in Example 2 is shown in Table 4.

TABLE 4

Basis weight and ash values for a handsheet made using the pigment from Example 2

| Basis weight (grams per square meter) | Ash (% titanium dioxide) |
|---|---|
| 128 | 39.6 |

Comparison of the results shown in Tables 3 and 4 indicate that the titanium dioxide pigment described in Example 2 results in a significantly higher ash level in the handsheet than Comparative Example 2. This indicates that the treatment of this pigment surface with the silane agent has resulted in a significantly stronger interaction of the pigment surface with the pulp surface.

COMPARATIVE EXAMPLE 3

The pigment described in Comparative Example 1 is used on pilot-scale paper machine using standard methods to produce a type of paper which is representative of paper used to produce decorative laminates. The resulting paper has a basis weight of about 80 grams per square meter and contains roughly 60 percent eucalyptus pulp, 35 percent titanium dioxide ash, and about 4.5% polyamine epichlorohydrin wet strength resin. The tensile strength of this paper is measured in a wet state and a dry state using the method described in part 2 of the ISO 1924 method, in both the machine and cross-machine directions. The results of these measurements are shown in Table 5.

TABLE 5

Strength of pilot-scale paper made using the pigment from Comparative Example 1, measured in Newtons

| Wet, machine direction | Wet, cross-machine direction | Dry, machine direction | Dry, cross-machine direction |
|---|---|---|---|
| 9 | 3.8 | 32.9 | 12 |

EXAMPLE 3

The pigment described in Example 1 is used on pilot-scale paper machine using standard methods to produce a type of paper which is representative of paper used to produce decorative laminates. The resulting paper has a basis weight of about 80 grams per square meter and contains roughly 60 percent eucalyptus pulp, 35 percent titanium dioxide ash, and about 4.5% polyamine epichlorohydrin wet strength resin. The strength of this paper is measured in wet and dry states using the same methods described in Comparative Example 3. The results of these measurements are shown in Table 6.

TABLE 6

Strength of pilot-scale paper made using the pigment from Example 1, measured in Newtons

| Wet, machine direction | Wet, cross-machine direction | Dry, machine direction | Dry, cross-machine direction |
|---|---|---|---|
| 11.9 | 4.7 | 40.1 | 14.3 |

Comparison of the results shown in Tables 5 and 6 indicates that treatment of the titanium dioxide pigment with the silane agent as described in Example 1 results in significant increase in the tensile strength of the paper in both wet and dry states, in both the machine and cross-machine directions as compared to the results of Comparative Example 1. The magnitude of these increases is roughly in the range 20 to 30 percent for like data categories in Tables 5 and 6.

The description of illustrative and preferred embodiments of the present disclosure is not intended to limit the scope of the disclosure. Various modifications, alternative constructions and equivalents may be employed without departing from the true spirit and scope of the appended claims.

What is claimed is:

1. A laminate comprising a paper comprising an impregnating resin a cellulose pulp, and a titanium dioxide pigment comprising an amino organosilane on its surface, the titanium dioxide pigment is in an amount of about 45 wt. % or less based on the total dry weight of the paper prior to resin impregnation, wherein the amino organosilane has the general formula (I)

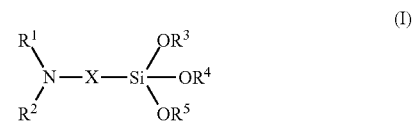

wherein:
$R^1$ and $R^2$ are each individually selected from the group consisting of hydrogen, alkyl, aryl, cycloalkyl, alkylaryl, alkenyl, cycloalkenyl, alkene, alkylene, arylene, alkylarylene, arylalkylene and cycloalkylene;

$R^3$, $R^4$ and $R^5$ are each individually selected from the group consisting of hydrogen, lower alkyl, aryl, lower alkylaryl, lower arylalkyl, alkenyl, cycloalkenyl, alkene, alkylene, arylene, alkylarylene, arylalkylene and cycloalkylene; and X is alkyl, aryl, alkylaryl, arylalkyl, cycloalkyl, alkenyl, cycloalkenyl, alkene, alkenylene, cycloalkenylene, alkylene, arylene, alkylarylene, arylalkylene, cycloalkylene, with or without secondary or tertiary nitrogen pendant from the chain or other functional groups.

2. The laminate of claim 1, wherein $R^1$ and $R^2$ are each individually selected from the group consisting of hydrogen and an alkyl group of 1-8 carbon atoms; and $R^3$, $R^4$ and $R^5$ are each individually selected from the group consisting of hydrogen and an alkyl group of 1-8 carbon atoms; and X is an alkyl group of 1-8 carbon atoms.

3. The laminate of claim 2, wherein both of $R^1$ and $R^2$ are hydrogen; and $R^3$, $R^4$ and $R^5$ are each individually selected from an alkyl group of 1-4 carbon atoms; and X is an alkyl group of 1-4 carbon atoms.

4. A laminate comprising a paper comprising an impregnating resin, a cellulose pulp, and a titanium dioxide pigment comprising an amino organosilane on its surface, the titanium dioxide pigment is in an amount of about 45 wt % or less based on the total dry weight of the sheet prior to resin impregnation, wherein the amino organosilane is selected from the group consisting of aminoethyl trimethoxysilane, aminoethyl triethoxysilane, aminopropyl trimethoxysilane, aminopropyl triethoxysilane, methylaminopropyl trimethoxysilane, ethylaminopropyl trimethoxysilane, aminopropyl tripropoxysilane, aminoisobutyl trimethoxysilane, and aminobutyl triethoxysilane.

5. The laminate of claim 1, wherein the amino organosilane is aminopropyl triethoxysilane.

6. The laminate of claim 1, wherein the titanium dioxide pigment is a phosphated metal oxide coated titanium dioxide pigment.

7. The laminate of claim 1, wherein the paper is substantially white.

8. The laminate of claim 1, wherein the paper has a coloration or a design printed thereon.

9. The laminate of claim 1, wherein the titanium dioxide pigment comprising an amino organosilane on its surface, has a substantially monolayer coverage of the amino organosilane on its surface.

10. A composition comprising a, cellulose pulp, and a titanium dioxide pigment comprising an amino organosilane on its surface, the titanium dioxide pigment is in an amount of about 45 wt. % or less of the composition when it is dried wherein the amino organosilane has the general formula (I)

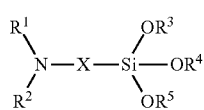

(I)

wherein:
$R^1$ and $R^2$ are each individually selected from the group consisting of hydrogen, alkyl, aryl, cycloalkyl, alkylaryl, alkenyl, cycloalkenyl, alkene, alkylene, arylene, alkylarylene, arylalkylene and cycloalkylene;

$R^3$, $R^4$ and $R^5$ are each individually selected from the group consisting of hydrogen, lower alkyl, aryl, lower alkylaryl, lower arylalkyl, alkenyl, cycloalkenyl, alkene, alkylene, arylene, alkylarylene, arylalkylene and cycloalkylene; and X is alkyl, aryl, alkylaryl, arylalkyl, cycloalkyl, alkenyl, cycloalkenyl, alkene, alkenylene, cycloalkenylene, alkylene, arylene, alkylarylene, arylalkylene, cycloalkylene, with or without secondary or tertiary nitrogen pendant from the chain or other functional groups.

11. A paper comprising a cellulose pulp and a titanium dioxide pigment comprising an amino organosilane on its surface, the titanium dioxide pigment is in an amount of about 45 wt % or less based on the total dry weight of the paper.

12. The paper of claim 11, wherein the amino organosilane has the general formula (I)

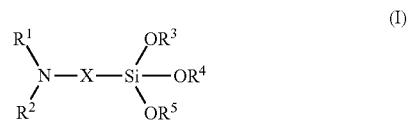

(I)

wherein:
$R^1$ and $R^2$ are each individually selected from the group consisting of hydrogen, alkyl, aryl, cycloalkyl, alkylaryl, alkenyl, cycloalkenyl, alkene, alkylene, arylene, alkylarylene, arylalkylene and cycloalkylene;

$R^3$, $R^4$ and $R^5$ are each individually selected from the group consisting of hydrogen, lower alkyl, aryl, lower alkylaryl, lower arylalkyl, alkenyl, cycloalkenyl, alkene, alkylene, arylene, alkylarylene, arylalkylene and cycloalkylene; and X is alkyl, aryl, alkylaryl, arylalkyl, cycloalkyl, alkenyl, cycloalkenyl, alkene, alkenylene, cycloalkenylene, alkylene, arylene, alkylarylene, arylalkylene, cycloalkylene, with or without secondary or tertiary nitrogen pendant from the chain or other functional groups.

13. The paper of claim 12, wherein $R^1$ and $R^2$ are each individually selected from the group consisting of hydrogen and an alkyl group of 1-8 carbon atoms; and $R^3$, $R^4$ and $R^5$ are each individually selected from the group consisting of hydrogen and an alkyl group of 1-8 carbon atoms; and X is an alkyl group of 1-8 carbon atoms.

14. The paper of claim 11 further comprising an impregnating resin.

15. The paper of claim 14 wherein the impregnating resin is a thermosetting polymer.

16. The paper of claim 11 wherein the paper is a decorative paper.

17. A laminate comprising the paper of claim 11.

18. A laminate comprising the paper of claim 14.

19. A composition comprising a cellulose pulp and a titanium dioxide pigment, comprising an amino organosilane on its surface, in an amount of about 45 wt % or less of the composition when it is dried.

* * * * *